United States Patent [19]

Cochrane et al.

[11] Patent Number: 6,081,801
[45] Date of Patent: Jun. 27, 2000

[54] SHARED NOTHING PARALLEL EXECUTION OF PROCEDURAL CONSTRUCTS IN SQL

[75] Inventors: Roberta Jo Cochrane, Los Gatos; George Lapis; Mir Hamid Pirahesh, both of San Jose, all of Calif.; Richard Sefton Sidle, Toronto, Canada; David Everett Simmen; Tuong Chanh Truong, both of San Jose, Calif.; Monica Sachiye Urata, Saratoga, Calif.

[73] Assignee: International Business Machines Corporation, Armonk, N.Y.

[21] Appl. No.: 08/885,479

[22] Filed: Jun. 30, 1997

[51] Int. Cl.$^7$ ........................... G06F 17/00
[52] U.S. Cl. .................. 707/3; 707/8; 707/201
[58] Field of Search ................ 395/675, 704, 395/0.29; 707/2, 3, 201, 202, 203, 8

[56] References Cited

U.S. PATENT DOCUMENTS

| | | | |
|---|---|---|---|
| 5,175,856 | 12/1992 | Van Dyke et al. | 395/704 |
| 5,367,675 | 11/1994 | Cheng et al. | 707/2 |
| 5,423,037 | 6/1995 | Hvasshovd | 707/202 |
| 5,471,622 | 11/1995 | Eadline | 707/3 |
| 5,515,531 | 5/1996 | Fujiwara et al. | 707/3 |
| 5,551,027 | 8/1996 | Choy et al. | 707/201 |
| 5,555,404 | 9/1996 | Torbjornsen et al. | 707/202 |
| 5,634,125 | 5/1997 | Li | 707/203 |
| 5,687,369 | 11/1997 | Li | 707/203 |
| 5,692,174 | 11/1997 | Bireley et al. | 707/3 |
| 5,701,482 | 12/1997 | Harrison et al. | 395/675 |
| 5,745,746 | 4/1998 | Jhingran et al. | 707/2 |
| 5,745,781 | 4/1998 | Ekanadham et al. | 395/800.29 |
| 5,761,653 | 6/1998 | Schiefer et al. | 707/2 |

OTHER PUBLICATIONS

Erhard Rahm and Robert Marek, "Analysis of Dynamic Load Balancing Strategies for Parallel shared Nothing Database Systems", Proceedings of 19th Very Large Databases Conference, Aug. 24–27 1993, pp. 182–193.

"Integrating Triggers and Declarative Constraints in SQL Database Systems", Proc. of the 22$^{nd}$ Int. Conf. On Very Large Databases (1996) (Cochrane, et al.).

*Primary Examiner*—Wayne Amsbury
*Assistant Examiner*—Thuy Pardo
*Attorney, Agent, or Firm*—Gray Cary Ware Freidenrich

[57] ABSTRACT

An automated methodology, and an apparatus for practicing the methodology, which enables the power and flexibility inherent in shared nothing parallel database systems (MPP) to be utilized on complex queries which have, heretofore, contained query elements requiring local computation or local coordination of data computation performed across the nodes of the distributed system. The present invention provides these features and advantages by identifying and marking the subgraphs containing these types of query elements as "no TQ zones" in the preparation phase prior to optimization. When the optimizer sees the markings, it builds a plan that will force the computation of the marked subgraphs to be in the same section. This preparation phase also provides the partitioning information for all inputs to the "no TQ zones". This allows the bottom-up optimizer to correctly plan the partitioning for the "no TQ zones". These partitionings can force the operation to a single-node, the coordinator node, the catalog node, or to a particular partition class on multiple nodes, or nodegroups.

8 Claims, 10 Drawing Sheets

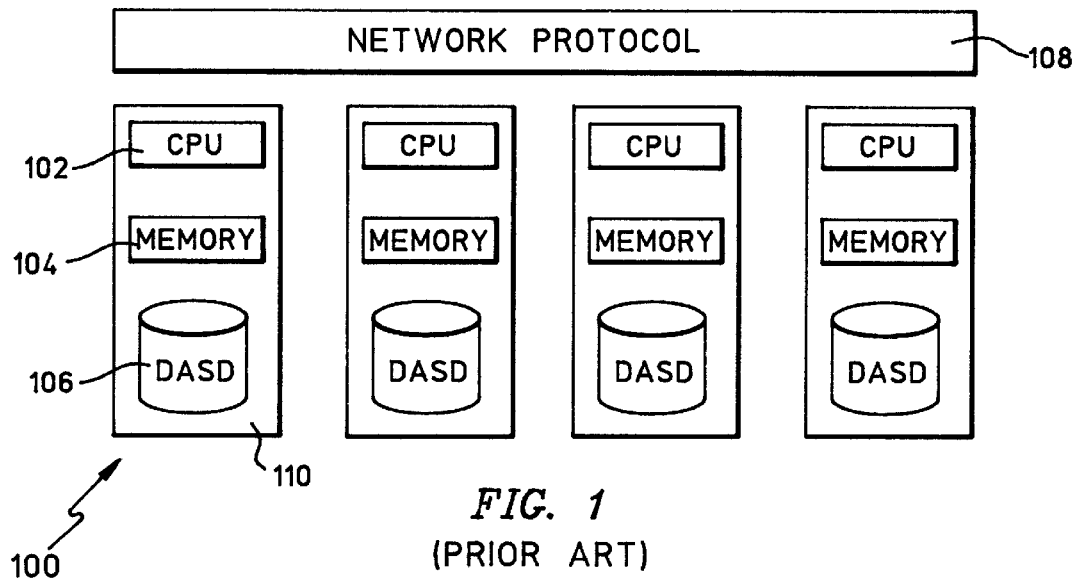
FIG. 1
(PRIOR ART)
SELECT $T_1 C_1$, $T_2 C_1$ FROM $T_1 T_2$ WHERE $T_1 C_2 = T_2 C_1$
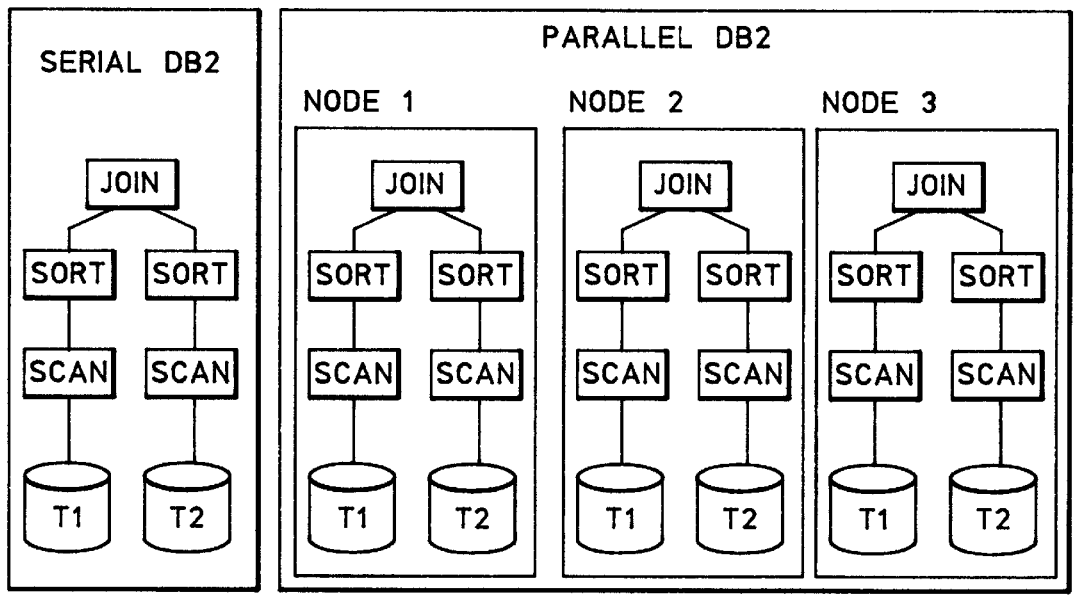
FIG. 2A     FIG. 2     FIG. 2B
(PRIOR ART)

SHARED NOTHING PARALLEL EXECUTION OF PROCEDURAL CONSTRUCTS IN SQL

CROSS-REFERENCE TO RELATED APPLICATIONS

The following applications, filed on Jun. 30, 1997 contain material related to the subject matter of this application, and are incorporated herein by reference:

"Intelligent Compilation of Procedural Functions for Query Processing Systems", Ser. No. 08/884,998 now is pending and "Intelligent Compilation of Scripting Language for Query Processing Systems", Ser. No. 08/884,820, now is pending.

BACKGROUND OF THE INVENTION

1. Field of the Invention

This invention relates generally to systems for automatic query optimization and execution in parallel relational database management systems and particularly to a system for efficiently executing complex queries across a plurality of nodes of a distributed relational database management system while maintaining database integrity.

2. Description of the Related Art

A relational database management system (RDBMS) is a computer-implemented database management system that uses relational techniques for storing and retrieving data. Relational databases are computerized information storage and retrieval systems in which data in the form of tables (formally denominated "relations") are typically stored for use on disk drives or similar mass data stores. A "table" includes a set of rows (formally denominated "tuples" or "records") spanning several columns. Each column in a table includes "restrictions" on the data contents thereof and may be designated as a primary or foreign key. Reference is made to C. J. Date, *An Introduction to Database Systems,* 6th edition, Addison-Wesley Publishing Co. Reading, Mass. (1994) for a comprehensive general treatment of the relational database art.

A RDBMS is structured to accept statements to store, retrieve and delete data using high-level query languages such as the Structured Query Language (SQL). The term "query" denominates a set of statements for retrieving data from a stored database. The SQL standard has been promulgated by the International Standards Association since 1986. Reference is made to the SQL-92 standard "Database Language SQL" published by the ANSI as ANSI X3.135-1992 and published by the ISO as ISO/IEC 9075:1992 for the official specification of the 1992 version of the Structured Query Language. Reference is also made to James R. Groff et al. (*LAN Times Guide to SQL*, Osborne McGraw-Hill, Berkeley, Calif., 1994) for a lucid treatment of SQL-92, and to Don Chamberlin, *Using the New DB2*, Morgan Kaufmann Publishers, San Francisco, 1996, for a discussion of that language, which implements SQL. Finally, reference is also made to several IBM technical publications, to include definitions for some of the terminology used herein:

IBM Systems Journal, Vol. 34, No. 2, 1995.

DB2 AIX/6000 Admin. Guide, SC09-1571.

DB2 Parallel Edition for AIX Admin. Guide and Reference, SC09-1982.

DB2 Parallel Edition for AIX Performance and Tuning Guide, SG24-4560.

The phenomenal growth rate and use of client/server networks and database systems, as well as recent technological advances in parallel computing have given rise to the use of commercial parallel database systems by many major corporations. Businesses and other users today require database management systems that can sustain the burgeoning demands of decision support, data mining, trend analysis, multimedia storage, and the use of complex queries in a variety of applications. Parallel processing systems provide the availability, reliability, and scalability that previously were available only from traditional mainframe systems.

There currently exist several hardware implementations for parallel computing systems, including but not necessarily limited to:

Shared-memory approach—processors are connected to common memory resources; all inter-processor communication can be achieved through the use of shared memory. This is one of the most common architectures used by systems vendors. Memory bus bandwidth can limit the scalability of systems with this type of architecture.

Shared-disk approach—processors have their own local memory, but are connected to common disk storage resources; inter-processor communication is achieved through the use of messages and file lock synchronization. I/O channel bandwidth can limit the scalability of systems with this type of architecture.

Shared-nothing approach—As shown in prior art FIG. 1, in a shared-nothing implementation 100, processors 102 have their own local memory 104 and their own direct access storage device (DASD) such as a disk 106; all inter-processor communication is achieved through the use of messages transmitted over network protocol 108. A given processor 102, in operative combination with its memory 104 and disk 106 comprises an individual network node 110. This type of system architecture is referred to as a massively parallel processor system (MPP). While this architecture is arguably the most scalable, it requires a sophisticated inter-processor communications facility to send messages and data between processors. One shared-nothing implementation of IBM's DB2 Parallel Edition approaches near-linear performance scale-up as nodes are added to a parallel system.

Exploiting MPP architecture

DB2 currently executes on at least IBM's AIX/6000 platform, and supports the execution of multiple database servers (or nodes) on a number of processors including the SP2 and on multiple RISC/6000 processors connected via basic LAN communication facilities. DB2 instances that run on the SP2 using the high performance switch have significant performance gains and broader processor scalability than instances running on RISC/6000 clusters. Both of these hardware architectures apply the multiple-instruction, multiple-data (MIMD) approach to parallelism.

MIMD-based Parrallism

This approach to parallelism calls for multiple instruction streams to be simultaneously applied to multiple data streams. The biggest challenges facing database systems that use the MIMD form of parallelism are:

a. implementing a distributed deadlock detection and multi-phase commit protocol b. handling inter-processor communications effectively and efficiently c. breaking a processing request into manageable, independent components.

DB2 PE (Parallel execution) was developed as an extension to DB2 for the AIX/6000 Version 1 product. The non-parallel version is now referred to as DB2 Standard Edition. The DB2 PE extension, hereafter simply referred to as DB2, constituted, in the most basic terms, a replication of the database and database server components into an array of nodes or a database and Database Manager partition. Data is distributed across one or more nodes in a parallel configuration and the Database Manager at each node manages its part of the database independently from all other nodes. The ratio of processors to nodes can be one-to-one or one-to-many. The nodes defined in a one-to-many configuration are referred to as logical nodes. The parallel extension includes a function shipping strategy to send individual work requests to each of the nodes in a transaction.

The DB2 function shipping strategy involves decomposing a SQL statement into smaller parts, or sub-requests, and then routing the sub-requests to the nodes that are responsible for a portion of the table. Sub-requests are run in parallel; each node sends back qualifying rows to the initiator of the request which, in turn, builds the final answer set that is returned to the user or application.

Flow diagrams of a SQL statement that has been fully decomposed or partitioned on both a parallel and a non-parallel DB2 server, as detailed in prior art FIG. 1, are shown at prior art FIGS. 2A and 2B. In a serial implementation of DB2, the query plan is executed on a single node, as shown in FIG. 2A. A parallel implementation of DB2 enables the decompositioning, or partitioning of a query plan into a plurality of subplans, also referred to as subqueries, which are executed on the several nodes of the network, as shown in FIG. 2B.

The monolithic query plan which executes a complex query on a single node (UNI) is shown at FIG. 3A as 300. In contrast, a shared nothing MPP query executing the same plan on a number of nodes is shown in FIG. 3B.

Parallel Transactions

Having reference to the latter figure, plan 300 is partitioned by the DBMS into a number of subqueries, also referred to as subplans, or sections, 302–308. The subplans are logically connected to one another by means of table queues (TQs), 402–408. Each subplan is executed on a specified node or nodegroup. A nodegroup consists of 1-n nodes.

Referring now to FIG. 4, subplan 306 is shown to include at least one, and typically a plurality of operators 402–408, forming a strongly-connected component called a cycle, 410. It wil be understood by those having ordinary skill in the art that not all strongly-connected components are cycles. This cycle is in the query flow, and must be completed on tables T1 and T2, and the results passed to subquery 304. Each of the logical data connections between the several subplans, as well as between the subplans and their respective base tables are made by means of tables queues (TQs). DB2 supports both types of SQL decomposition because it allows tables to be defined on one or on many nodes. The physical distribution of data by DB2 is completely transparent to a user or to an application that accesses the data via SQL.

SQL statements executed by a parallel DB2 server are decomposed and processed using a master-slave agreement between processes and processors. A sample DB2 processing model created by an application that issues a simple query against a table with data spread out across several nodes is shown at prior art FIG. 5. When an application 500 initiates a connection to a parallel database at a node (the coordinating node, 502), a master process, or coordinating agent A1 504, is created to delegate work to subordinate processes or parallel agents A2, A3, A4 (506–510 respectively), located on both coordinating node 502 and other parallel nodes 512 and 514. Each node has access to a partition of the table, 516. The coordinating node and agent remain associated with an application until the application completes.

Coordinating Node

A database connection can emanate from any node in a parallel system, regardless of the location of tables processed by the application. The node at which a connection is started automatically becomes the coordinating node for that application. Consider the location and the frequency of database connects carefully when designing application systems. A large database system could experience bottlenecks at the coordinating node that is required to do heavy sorting when running queries. The coordinating node for a for a given application is a single node. Different applications executed on the same parallel system may have different designated coordinating nodes.

Distributing Data for Query Performance

DB2 allows you to divide tables across all of the nodes in a configuration or across subsets of nodes. This latter type of distribution is referred to as partial declustering. The rows of a table are distributed to the nodes defined in a nodegroup list specified on the CREATE TABLE statement. To distribute a row to the appropriate node, a hash partitioning strategy is used.

Each table in a multi-node nodegroup uses a partitioning key specified or defaulted to when the table was created. When a table row is inserted, a hashing algorithm is applied to the partitioning key value to produce an index into a partitioning map, which is an array of 4096 entries. Each entry in the partitioning map contains a node number where the row is to be stored. IBM has implemented a share-nothing version of its DB2 Parallel Edition, referred to as DB2, which approaches near-linear performance scale-up as nodes are added to a parallel system.

Choosing an appropriate partitioning key is important because it has a direct impact on performance. This has a direct bearing on the join strategies that the optimizer uses. The optimizer selects join strategies based on a lowest-cost strategy. Prior art FIGS. 6–8 provide an illustration of the different join methods used by DB2. The join methods, in lowest to highest computational cost order, are:

collocated—referring to FIG. 6, joined tables 604 and 604' are located on the same node 402 and each corresponding partitioning column is in an equal predicate; this type of join is done at the node-level and requires less communications overhead;

directed—referring to FIG. 7, joined tables 704 and 704' are sent from their nodes, 506 and 508 respectively, to another node, 710, where the local join is done repartitioned—referring to FIG. 8, rows from both tables are redistributed to a single node and repartitioned on the joining attributes; and broadcast—again referring to FIG. 8, all of the rows of one table are broadcast to the rows of the other table; this type of join incurs a high amount of communications overhead and should be avoided if possible.

As used herein, a "query" refers to a set of statements for retrieving data from the stored database. The query language requires the return of a particular data set in response to a particular query but the method of query execution ("Query Execution Plan") employed by the DBMS is not specified by the query. There are typically many different useful execution plans for any particular query, each of which returns the required data set. For large databases, the execution plan selected by the DBMS to execute the query must provide the required data return at a reasonable cost in time and hardware resources. Most RDBMSs include a query optimizer to translate queries into an efficiently executable plan. According to the above-cited Date reference, the overall optimization process includes four broad stages. These are (1) casting the user query into some internal representation, (2) converting to canonical form, (3) choosing prospective implementation procedures, and (4) generating executable plans and choosing the cheapest, or most computationally efficient of these plans.

For example, prior art FIG. 9 shows a query translation process known in the art. Queries written in SQL are processed in the phases shown, beginning with lexing at step 913, parsing and semantic checking at step 914, and conversion to an internal representation denoted the Query Graph Model (QGM) 915, which is a command data-structure that summarizes the semantic relationships of the query for use by the query translator and optimizer components. A query global semantics (QGS) process 917 adds constraints and triggers to QGM 915. A QGM optimization procedure 916 then rewrites the query into canonical form at the QGM level by iteratively "rewriting" one QGM 915 into another semantically equivalent QGM 915. Reference is made to U.S. Pat. No. 5,367,675 issued to Cheng et al., entirely incorporated herein by this reference, for a discussion of a useful QGM rewrite technique that merges subqueries. Also, reference is made to U.S. Pat. No. 5,276,870 wherein Shan et al. describe a QGM optimization technique that introduces a "view" node function to the QGM to permit base table references to "VIEWs" by other nodes. This conditions the QGM to permit the execution plan optimizer 918 to treat a view like a table. Finally, reference is made to U.S. Pat. No. 5,546,576 for a discussion of a Query Optimizer System which detects and prevents mutating table violations of database integrity in a query before generation of an execution plan. QGM 15 used in the Query Rewrite step 16 can be understood with reference to Pirahesh et al. ("Extensible/Rule-Based Query Rewrite Optimization in Starburst", *Proc. A CM-SIGMOD Intl. Conf on Management of Data*, San Diego, Calif., pp. 39–48, June 1992).

A useful QGM known in the art, and described in the '576 reference is now described in detail. FIG. 15 provides a QGM graphical representation of the following SQL query:

```
SELECT DISTINCT Q1.PARTNO, Q1.DESCR, Q2.PRICE
FROM INVENTORY Q1, QUOTATIONS Q2
    WHERE Q1.PARTNO=Q2.PARTNO
    AND Q2.PRICE > 100
```

A SELECT box 1524 is shown with a body 1526 and a head 1528. Body 1526 includes data-flow arcs 1530 and 1532, which are also shown as the internal vertices 1534 and 1536. Vertex 1536 is a set-former that ranges on (reads from) the box 1538, which provides records on arc 1532. Similarly, vertex 1534 ranges on box 1540, which flows records on data-flow arc 1530. The attributes to be retrieved from the query, PARTNO 1546, DESC 1548 and PRICE 1550, are in head 1528. Boxes 1538 and 1540 represent the base tables accessed by the query, INVENTORY 1542 and QUOTATIONS 1544, respectively. Box 1524 embraces the operations to be performed on the query to identify the PARTNOs that match in the two base tables, as required by the join predicate 1552 represented as an internal predicate edge joining vertices 1534 and 1536. Vertex 1534 also includes a self-referencing predicate 1554 to identify prices of those PARTNOs that exceed 100.

For the purposes of this invention, note that each box or node (formally denominated "quantifier node", or QTB) in FIG. 15 is coupled to one or more other nodes by data-flow arcs (formally denominated "quantifier columns" or QUNs). For instance, base table node 1538 is coupled to select node 1524 by data-flow arc 1532 and base table node 1540 is connected to select node 1524 by data-flow arc 1530. The activities inside select node 1524 produce a new stream of data records that are coupled to the TOP node 1556 along a data-flow arc 1558. TOP node 1556 represents the data output table requested by the query.

The object of several known QGM optimization procedures is to merge one or more nodes where possible by eliminating (collapsing) data-flow arcs. For instance, the above-cited Pirahesh et al. reference describes a set of rules for merging any number of nodes into a single SELECT node, with certain restrictions on non-existential or non-Boolean factor subqueries, set operators, aggregates and user-defined extension operators such as OUTER JOIN. Thus those skilled in the art know that QGM optimization step 916 usually rewrites the QGM to eliminate numerous nodes and data-flow arcs even before considering useful query execution plans in plan optimization step 918 (FIG. 9). Also, most execution plans usually pipeline data along the data-flow arcs without waiting to complete execution of a node before flowing data to the next node.

QGM optimization procedure 916 rewrites QGM 915 to simplify the subsequent plan optimization process 918, which produces Query Execution Plans (QEPs). Plan optimization procedure 918 generates alternative QEPs and uses the best QEP 920 based on estimated execution costs. The plan refinement procedure 922 transforms optimum QEP 920 by adding information necessary at run-time to make QEP 920 suitable for efficient execution. Importantly, the QGM optimization step 916 is separate and distinct from the QEP optimization in step 918. Reference is made to U.S. Pat. No. 5,345,585 issued to Iyer et al., entirely incorporated herein by this reference, for a discussion of a useful join optimization method suitable for use in QEP optimization step 918. Reference is made to U.S. Pat. No. 5,301,317 issued to Lohman et al., entirely incorporated herein by the reference, for a description of an adaptive QEP optimization procedure suitable for step 918.

QGM 915 used in the Query Rewrite step 916 can be understood with reference to Pirahesh et al. ("Extensible/Rule-Based Query Rewrite Optimization in Starburst", *Proc. A CM-SIGMOD Intl. Conf on Management of Data*, San Diego, Calif., pp. 39–48, Jun. 1992).

The concept of a "trigger" is well-known in the art, although triggers are not explicitly included in the SQL-92 or SQL-93 standard promulgated by the ISO. For any event that causes a change in contents of a table, a user may specify an associated action that the DBMS must execute. The three events that can "trigger" an action are attempts to INSERT, DELETE or UPDATE records in the table. The action triggered by an event may be specified by a sequence of SQL statements. Reference is made to the above-cited Owens et al. reference and the above-cited Groff et al. reference for detailed examples of row-level and statement-level triggers. Reference is made to Chamberlin, previously cited, for a discussion of triggers, and to "Integrating Triggers and Declarative Constraints in SQL Database Systems", Proc. of the 22nd Int. Conf. On Very Large Databases (1996) (Cochrane, et al.), for a discussion of the basis for the model of SQL-3 triggers.

The single overriding problem with implementing some complex queries on shared nothing parallel database systems (MPP), is that it is very difficult to perform actions that require local computation or local coordination of computation on data that is distributed among many nodes. Examples of such actions include, but are not necessarily limited to: recursive statements; the assignment of values to variables; the execution of the several statements of a row-level trigger; correlations to common subexpressions; the performance of any function that cannot be run in parallel (including those functions which must be run at the catalog node because they access catalog structures); the use of special registers use in buffered inserts; the provision for scrollable cursors which are a result of queries on distributed data; and, the checking of unique indexes which are distributed in MPP. These problems are briefly expounded below:

Recursion

By its very nature, recursion has an implied control flow that implements "until no more data, continue computing the query". This control flow is difficult to coordinate among nodes in a distributed system.

Assignment Statements

The assignment of a value to a variable must be performed on the node on which the target buffer location exists and will be used in the future. Further, a solution to this particular problem should allow several instances of the operations to run in parallel as long as a given assignment remains in the same node with its associated buffer.

Row-level Triggers

The statements of a row-level trigger must be performed for one row at a time. However, as long as there are not any semantic conflicts between the statements in a trigger, the statements of the trigger can be executed in parallel for each row.

Correlation to Common Subexpression

If a common subexpression is correlated, then all individual consumers of the expression must be collocated. Otherwise, the correlation values would be arriving at the common subexpression from diverse paths and it would be difficult to coordinate these correlation values.

Non-parallelizable and Catalog Functions

Any function that cannot be run in parallel (as dictated by the user during the CREATE FUNCTION) must be run on a single node. A special subclass of non-parallelizable functions must be run at the catalog node because they access catalog structures.

Special Register use in Buffered Insert

A discussion of the general topic of buffered inserts will be found in IBM Technical Publication *DB2 Parallel Edition for AIX Admnin. Guide and Reference*, SC09-1982. Since special register values exists in each section, these values are normally picked up directly from the section that uses them. However, for buffered insert, these values must come from a single node which is the coordinator. The reason is that each SQL statement creating a row to be inserted may have new values for special registers. Therefore, the value of special registers must be sent, via a TQ, to the nodes that execute the buffered insert.

Scrollable Cursors

In order to provide scrollable cursors that are a result of queries on distributed data, the results of the query must be shipped and stored at the coordinator node.

Deferred Unique

For FIPS, unique index checking is only performed at the end of a statement. This is after all other constraints are enforced, in particular cascaded referential integrity constraints. The check is verified by calling a data manager routine to perform the check for unique preservation on the index. However, indexes are distributed in MPP, and hence this function must be evaluated on each node where the potentially violated indices reside.

Each of the preceding complex query component issues illustrates a common problem in the processing of complex queries across the several nodes of a shared nothing parallel database system (MPP): it is very difficult to perform actions that require local computation or coordination of computation on data that is distributed among many nodes. In performing complex queries which incorporate any of the previously discussed computational actions, a user has heretofore been faced with a difficult choice: either limit the scope of the allowed query to preclude those actions which require local computation and thus enable use of the several nodes of the network; or enable those actions, but only to tables that are not partitioned across nodes, thereby losing the computational power of the distributed system.

What is needed then is a methodology, and an apparatus for practicing the methodology, which enables the power and flexibility inherent in shared nothing parallel database systems (MPP) to be utilized on complex queries which have, heretofore, contained query elements requiring local computation or local coordination of data computation performed acrons the nodes of the distributed system.

What is further needed is a methodology which enables, on shared nothing parallel database systems (MPP), the performance and execution of complex queries which include recursive statements.

What is also needed is a methodology which enables, on shared nothing parallel database systems (MPP), the performance and execution of complex queries which include the assignment of value to a variable.

What is yet further needed is a methodology which enables, on shared nothing parallel database systems (MPP), the performance and execution of complex queries which include the use of row-level triggers.

What is still further needed is a methodology which enables, on shared nothing parallel database systems (MPP), the performance and execution of complex queries which include correlation to a common subexpression.

What is moreover further needed is a methodology which enables, on shared nothing parallel database systems (MPP), the performance and execution of complex queries containing non-parallelizable functions and catalog functions.

What is still further needed is a methodology which enables, on shared nothing parallel database systems (MPP), the performance and execution of complex queries containing special registers useable in buffered inserts.

What is yet further needed is a methodology which enables, on shared nothing parallel database systems (MPP), the performance and execution of scrollable cursors resulting from queries on distributed data.

What is finally further needed is a methodology which enables, on shared nothing parallel database systems (MPP), the performance and execution of complex queries which enable the deferral of uniques checking until the logic end of a statement is completed.

These unresolved problems and deficiencies are clearly felt in the art and are solved by this invention in the manner described below.

SUMMARY OF THE INVENTION

The present invention provides, a methodology, and an apparatus for practicing the methodology, which enables the power and flexibility inherent in shared nothing parallel database systems (MPP) to be utilized on complex queries which have, heretofore, contained query elements requiring local computation or local coordination of data computation performed across the nodes of the distributed system. The present invention provides these features and advantages by identifying and marking the subgraphs performing the above operations as "no TQ zones" in the preparation phase prior to optimization. When the optimizer sees the markings, it builds a plan that will force the computation of the marked subgraphs to be in the same section. This preparation phase also provides the partitioning information for all inputs to the "no TQ zones". This allows the bottom-up optimizer to correctly plan the partitioning for the "no TQ zones". These partitionings can force the operation to a single-node, the coordinator node, the catalog node, or to a particular partition class on multiple nodes, or nodegroups.

The foregoing, together with other objects, features and advantages of this invention, can be better appreciated with reference to the following specification, claims and accompanying drawing.

BRIEF DESCRIPTION OF THE DRAWING

For a more complete understanding of this invention, reference is now made to the following detailed description of the embodiments as illustrated in the accompanying drawing, wherein:

FIG. 1 is view of a prior art MPP shared-nothing parallel architecture.

FIG. 2 is a prior art comparison between a complex database query implemented on a single computer, and the same query implemented on a network implementing an MPP shared-nothing parallel architecture.

FIG. 2A is a serial implementation of DB2.

FIG. 2B is a parallel implementation of DB2.

FIG. 3 is a prior art comparison between the query plan implementing a query on a single computer, and the same query plan implemented on a network implementing an MPP shared-nothing parallel architecture, whereby the query plan is partitioned into a plurality of sub-queries.

Table 1 is a pseudocode representation of one embodiment of the present invention detailing QGM processing of no-TQ zones.

Table 2 is a pseudocode representation of one embodiment of optimizer support for force partition and no-TQ zones.

Table 3 is a pseudocode representation of of one embodiment of threaded code generation and runtime support for common subexpressions.

DESCRIPTION OF THE PREFERRED EMBODIMENTS

The System of the Invention

Figure 10:
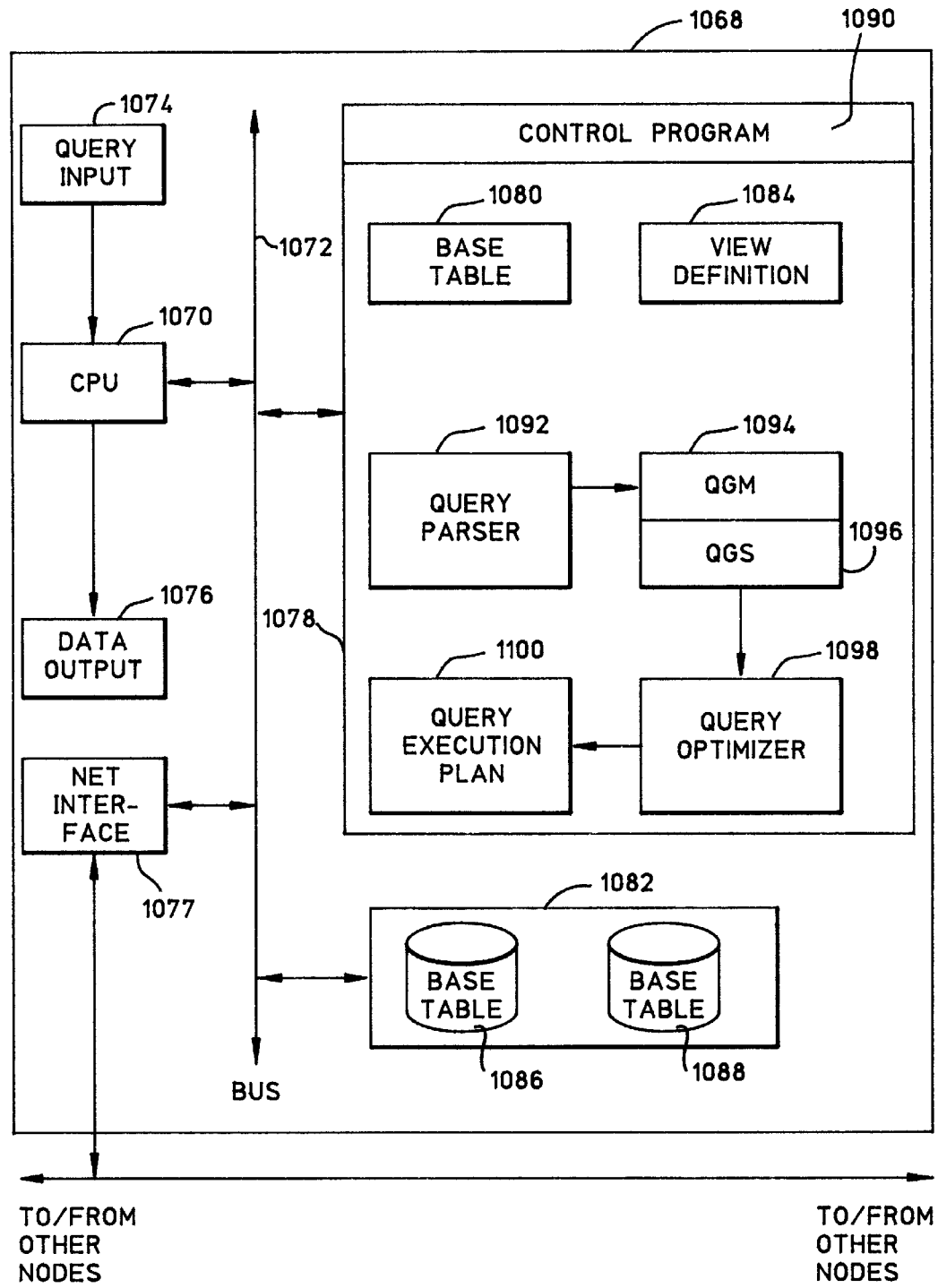
FIG. 10 is a block diagram of a database system capable of implementing the principles of the present invention.

FIG. 10 shows a functional block diagram of a computer-implemented database processing system 1068 suitable for practicing the procedure of this invention. This exemplary configuration is described for illustrative purposes only and it should be appreciated that the process and system of this invention can be embodied within system 1068 in many different useful fashions, including the arrangement depicted in FIG. 4. System 1068 includes a central processing unit (CPU) 1070, which is coupled to a parallel bus 1072. The query input terminal 1074 allows the user to enter queries into system 1068, either from a remote terminal or through any other useful method known in the art. As used herein, a "user query" includes a combination of SQL statements intended to produce one or more output data tables according to specification included in the query. The data output terminal 1076 displays the query results to the user and may be physically co-located with query input terminal 1074. A network interface 1077 connects this system to a network of similar systems, each of the systems forming a node of the network.

System 1068 includes the address space 1078, which is shown schematically as containing program objects and data objects. The base table 1080 is an example of a data object pulled into address space 1078 from the external mass store 1082 by way of bus 1072. The view definition 1084 is another data object representing a "virtual table" made up of elements from one or more base tables in accordance with a VIEW definition statement. External mass store 1082 includes a generally large plurality of base tables, exemplified by base tables 1086 and 1088. These base tables are moved partially or entirely between memory space 1078 and external mass store 1082 in a manner well-known in the art for database management systems.

Address space 1078 also includes the control program object 1090, which manages the other components of system 1068. These components include a query parser 1092 for accepting the query input from terminal 1074 and forwarding it to the Query Graph Model (QGM) optimizer 1094.

Figures 3A, 3B:
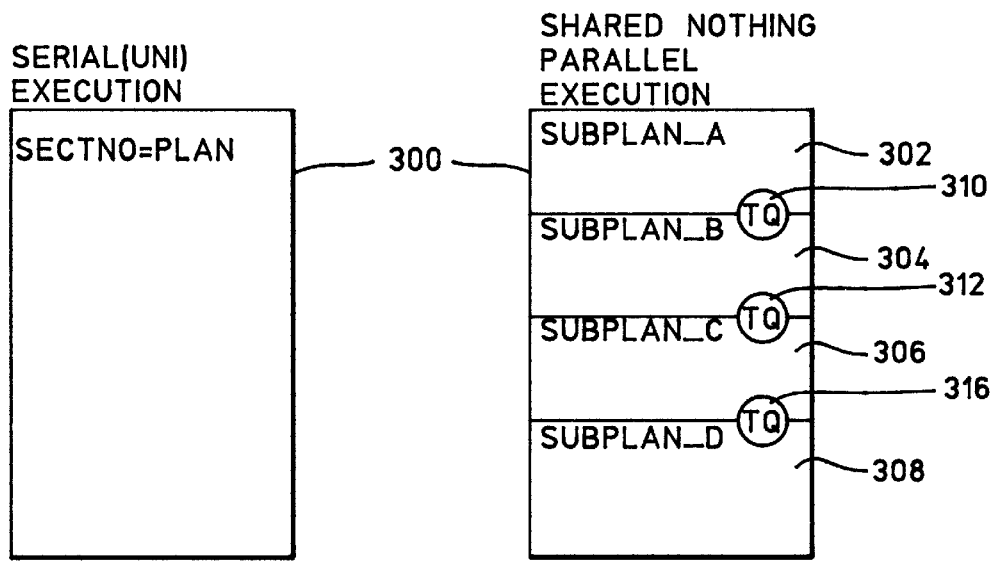
FIG. 3A is a monolithic query plan which executes a complex query on a single node.
FIG. 3B is a shared nothing MPP query executing the same plan or a number of nodes.
Figure 4:
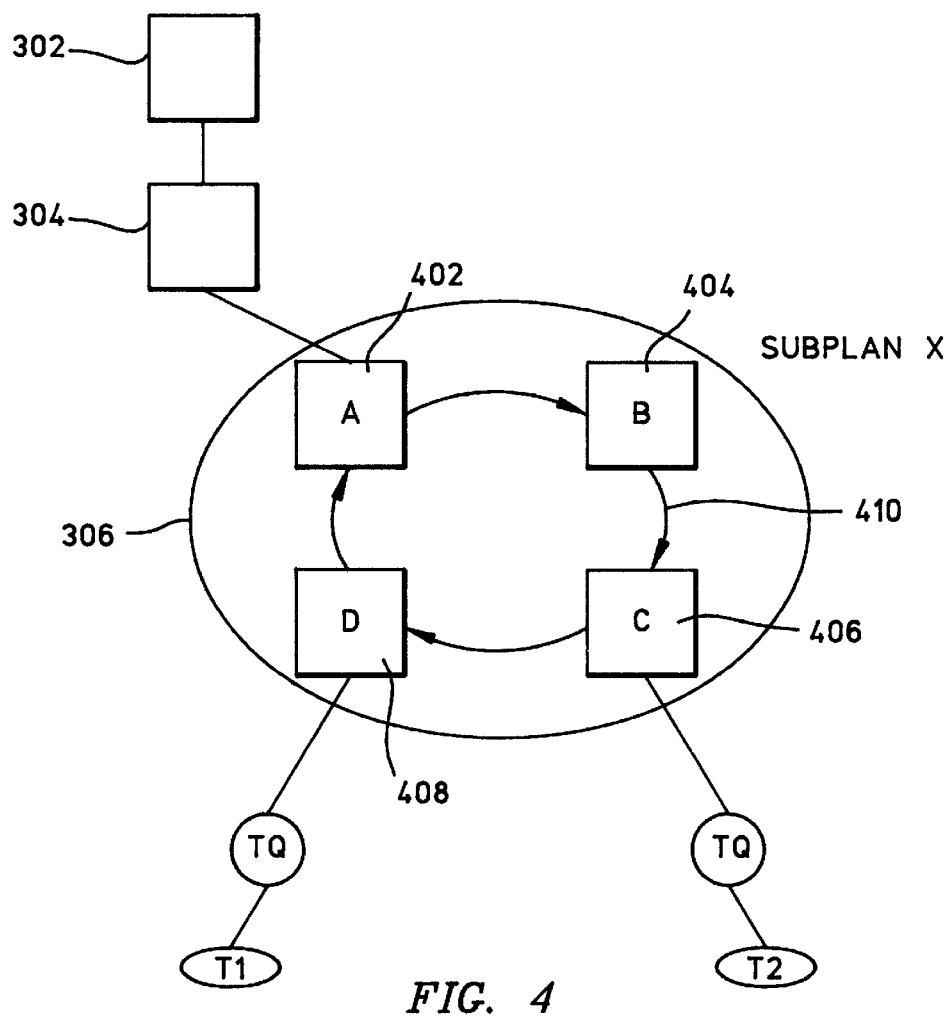
FIG. 4 is a prior art detail of one subquery, showing its interconnections to its base tables and its related subqueries.
Figure 5:
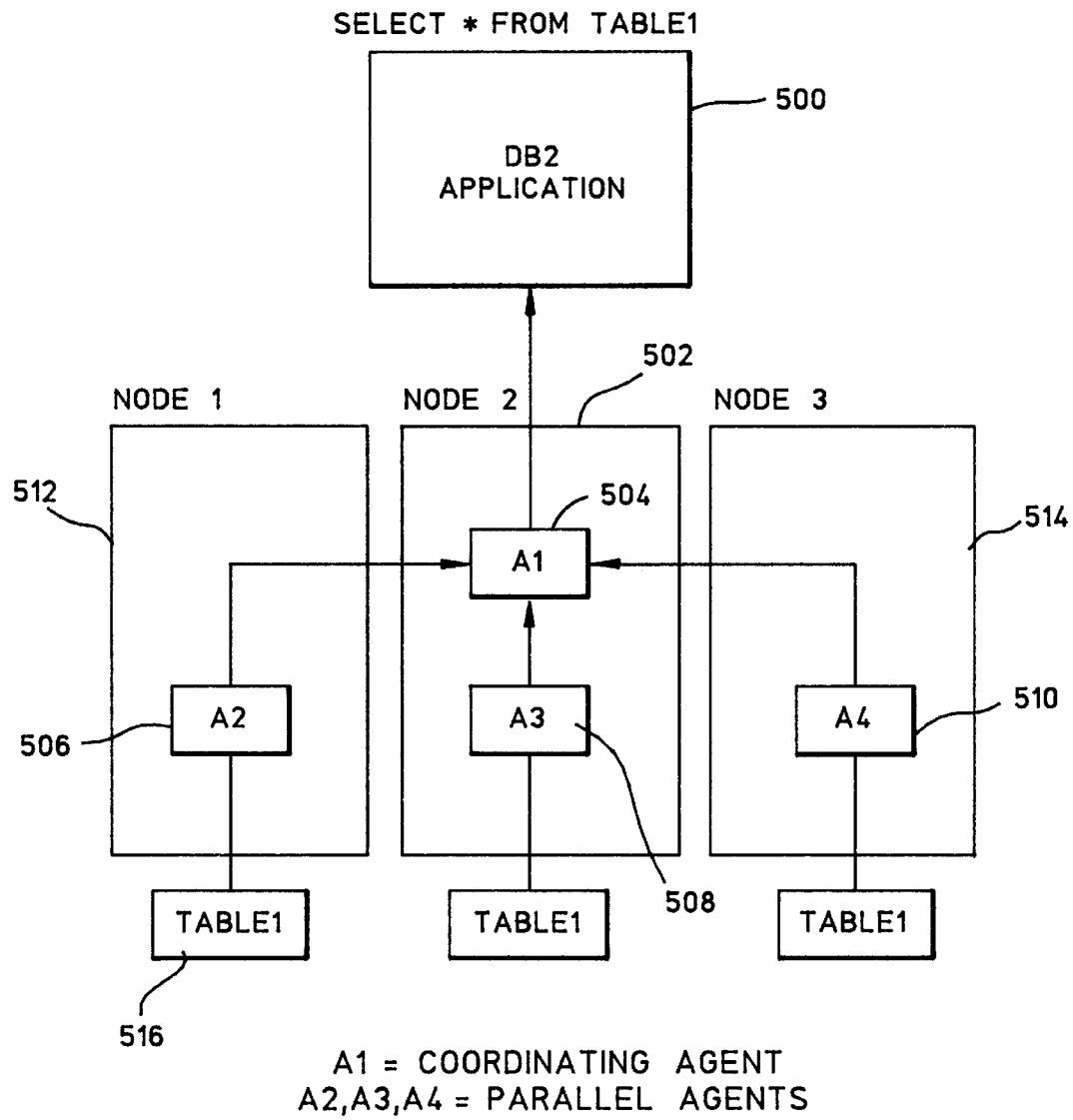
FIG. 5 is a prior art sample DB2 processing model created by an application that issues a simple query against a table with data spread out across several nodes
Figure 6:
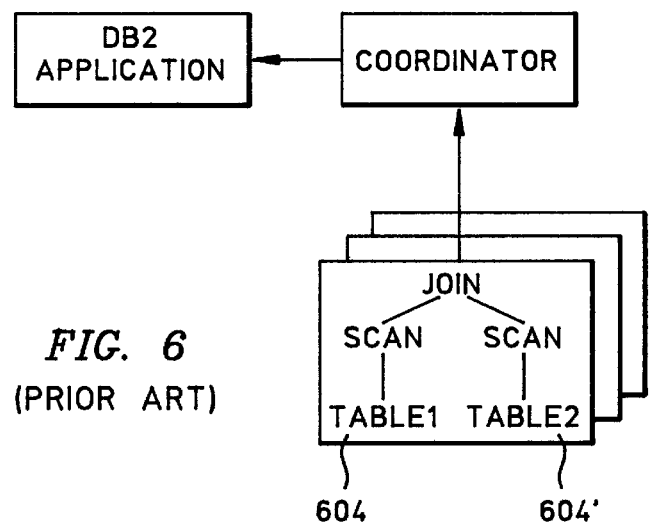
FIG. 6 is a block diagram of a prior art collocated join methodology.
Figure 7:
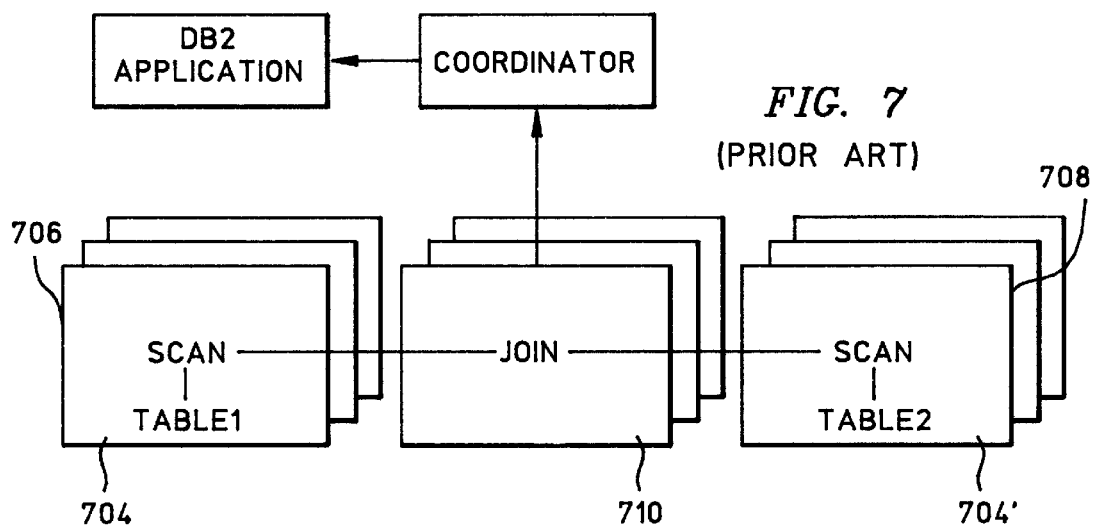
FIG. 7 is a block diagram of a prior art directed join methodology.
Figure 8:
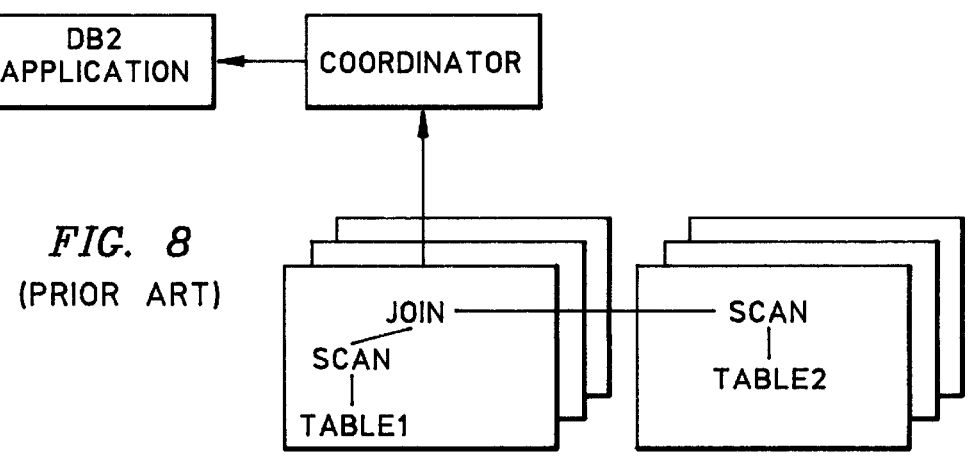
FIG. 8 is a block diagram of a prior repartitioned or broadcast join methodology.
Figure 9:
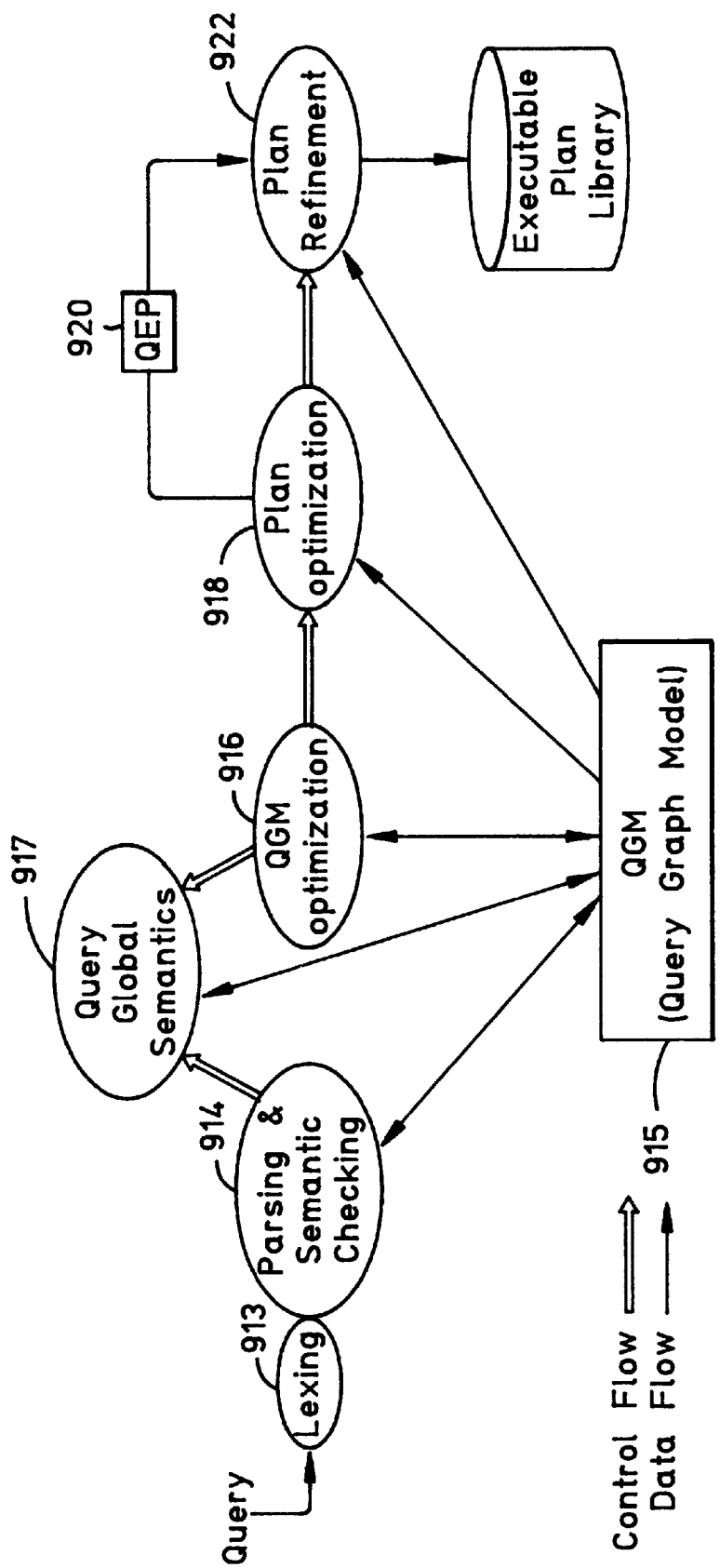
FIG. 9 is a block diagram of a prior art query graph model.

QGM optimizer 1094, with the participation of a query global semantics (QGS) processing module 1090, rewrites the QGM representation of the user query to provide a "canonical form" of the QGM for output to the query optimizer 1098. For instance, a QGM canonical form may include a large cyclical join graph organized within a single select node having data-flow arcs from many base tables, subject to the restrictions applied by QGS processing module 1096 and data-flow dam processing module 1097 on the QGM rewrite process. After query optimizer 1098 receives the canonical "database-integral" (DI) QGM from QGM optimizer 1094, a generally large number of useful plans for executing the DI-QGM are generated and tested for "cost" in accordance with a predetermined cost formula. Each of these execution plans is database-integral because the canonical QGM is database-integral. After identifying an "optimal" query execution plan, optimizer 1098 produces this plan as a program object, depicted as query execution plan 1100 in address space 78. Plan 1100 is finally executed with the assistance of control program 1090 and the resulting table is forwarded to data output of display 1076, or to other nodes of the network via net interface 1077, upon completion. It can be appreciated by those skilled in the art that the description of system 1068 in FIG. 4 is exemplary and that the system and process of this invention, may be incorporated in any RDBMS that uses a QGM optimization process.

Figure 11:
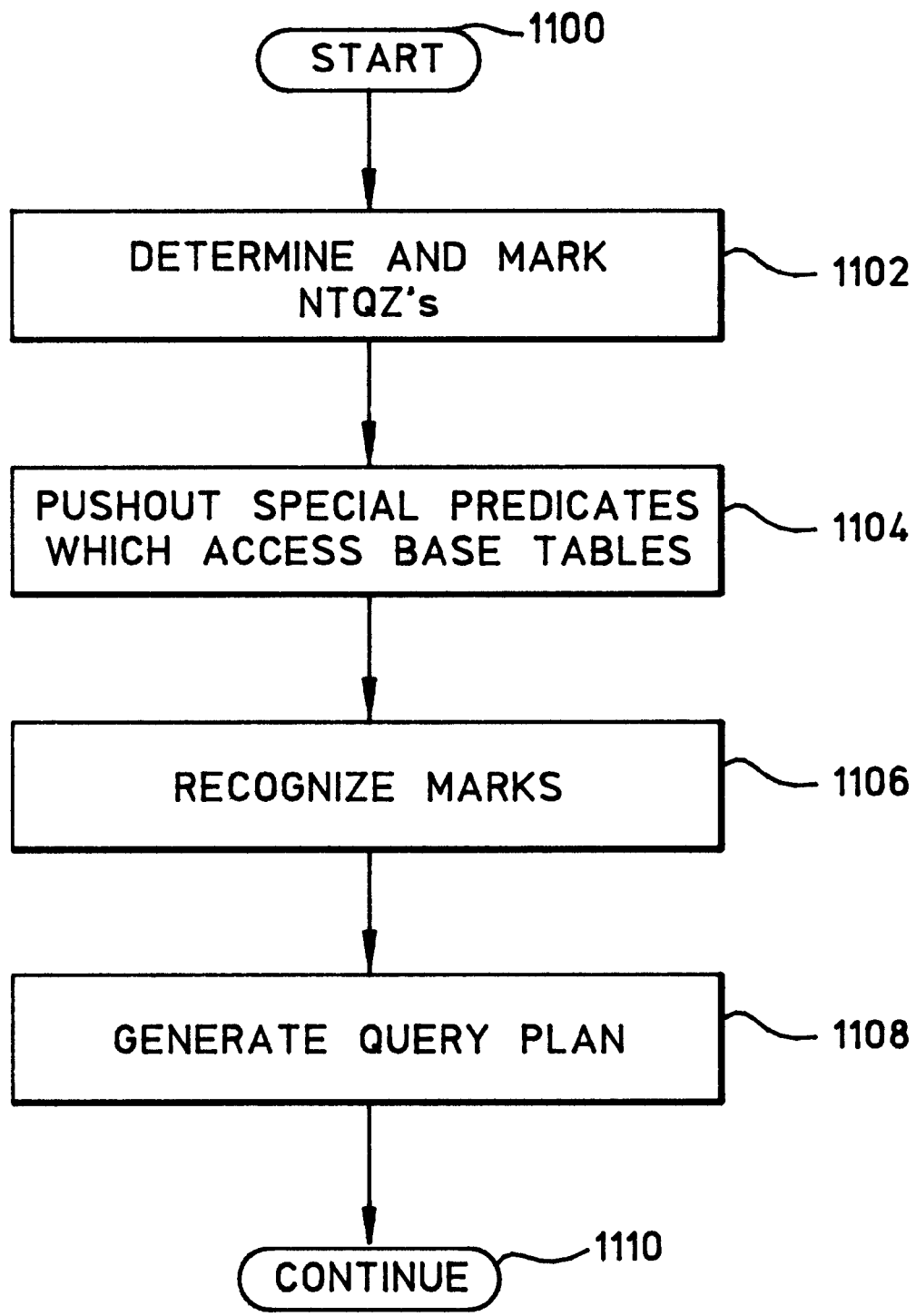
FIG. 11 is a block diagram of an overview of the principles of the present invention.

Referring now to FIG. 11, a broad overview of the principles of the present invention is shown. At the start of execution, the Query Graph Model (QGM) identifies and marks, at 1102, those subgraphs of the query which must be executed on a given node or nodegroup as "No TQ Zones", or NTQZs. Optionally, QGM pushes out of the NTQZ any special predicates which require access to the RDBMS' base tables at 1104. This option is taken when special predicates are in an NTQZ which require access to the REBMS' base tables, or when desirable for increased system performance. Responsive to step 1104, at step 1106 the query optimizer recognizes the marks generated at step 1102, and, responsive to this recognition, generates the query plan at step 1108 which forces the computation of the marked subgraphs to be in the same section. This allows the bottom-up optimizer to correctly plan the partitioning for the "no TQ zones". These partitionings can force the operation to a single-node, the coordinator node, the catalog node, or to a particular partition class on multiple nodes, or nodegroups. Execution of the program, including execution of the query plan follows at 1110.

QGM Support

The actions of the QGM in support of the several specialized query elements requiring computation on a single node or nodegroup are illustrated with reference to the pseudocode implementation given at Table 1, and discussed as follows:

Recursion

Reference is made to U.S. Pat. No. 5,546,570 for a discussion of some of the underlying terminology dealing with recursion in the present invention. QGM marks all boxes that participate in the recursion, and all arcs connecting such boxes as participating in a no-TQ-zone (NTQZ). That is, all boxes that are in the same strongly connected component of the query graph, and all quantifiers (QUNs) that connect these boxes are marked NTQZ. All QUNs to a strongly connected component are marked with the same forced partitioning.

In addition, QGM marks all recursive QUNs that range over common subexpressions (CSE's) with the same forced partitioning.

Set Statements

Set statements are the assignment statements that assign a given value to a target buffer location that is represented as a correlated reference (target qnc). Reference in made to copending applications identified as Docket No. ST9-97-072, "Intelligent Compilation of Procedural Functions for Query Processing Systems", Ser. No. 08/884,998 and Docket No. ST9-97-043, "Intelligent Compilation of Scripting Language for Query Processing Systems", Ser. No. 08/884,820, for a discussion of set statements. The assign function must be in the same logical unit (subsection) as its target qnc. and thus the path from the ASSIGN function to its target QNC must be NTQZ.

Accordingly, all boxes and QUNs on the path between the assignment statement and the box that contains the correlation variable are marked NTQZ by the QGM. All input QUNs to this path are marked with the same forced partitioning.

Figure 12:
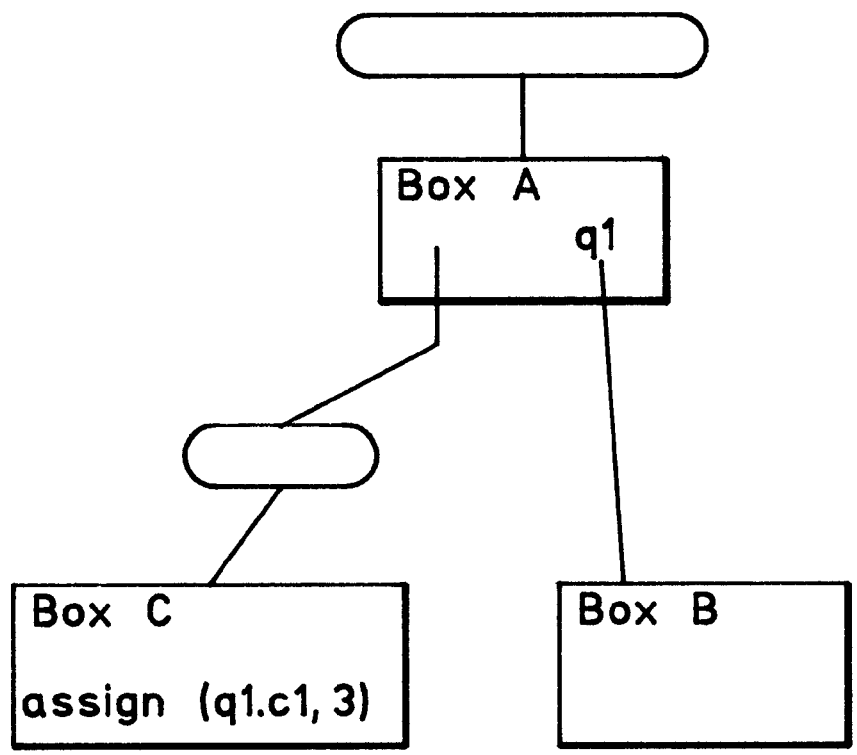
FIG. 12 is a modification to the query graph required by a deferred unique.

Having reference now to FIG. 12, ql.cl is a correlated reference to a column of Box B. All boxes and QUNs on the path between and including Box C and Box A are marked NTQZ. Any QUNs that are not on the path but are input to the boxes on the path are marked with the same forced partitioning.

Row-level Triggers

QGM forces the partitioning from the triggering operation to the trigger control box to a single node. This will synchronize the execution of the trigger body for each row of the trigger operation.

Correlation to Common Subexpression

QGM creates a NTQZ for each common subexpression that contains correlated references to boxes outside the CSE. The NTQZ is the portion of the graph from the correlated CSE to its nearest dominator in the graph. All inputs to this NTQZ are then marked with the same forced partitioning.

Non-parallelizable/Catalog Functions

Any function that cannot be run in parallel (as dictated by the user during CREATE FUNCTION) must be run on a single node. Catalog functions must only be run on the catalog node. As much as possible, QGM attemps to isolate the catalog functions/non-parallelizable functions from other functions of data access. QGM then marks the box containing the function(s) as NTQZ and marks the input QUN with forced partitioning to either: (1) the coordinator node if none of the functions are catalog functions: or, (2) the catalog node if at least one of the functions is a catalog function.

Special Register use in Buffered Insert

For a buffered insert, QGM marks the entire subgraph that computes the values to be inserted as NTQZ with forced partitioning to the coordinator.

Scrollable Cursors

In order to provide scrollable cursors that are a result of queries on distributed data, the results of the query must be shipped and stored at the coordinator node. However, all other computations of the query can be performed in parallel as chosen by the optimizer. Accordingly, QGM adds a select box to the top of the query graph, forces a temporary table to be created between this box and the remainder of the graph, marks the box to be NTQZ, and forces the partitioning of the input QUN of the box to the coordinator.

Deferred Unique

The deferred unique is implemented with a function that is called once for all indices. It is necessary to call it once for each set of tables that are modified by the query. We will have one of the graphs shown in FIG. 12 for each table modified by the query.

Figure 13:
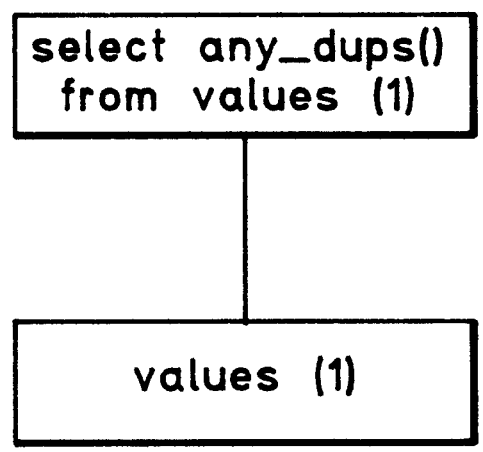
FIG. 13 is a flow diagram of a deferred unique which is implemented with a function that is called once for all indices.

This is accomplished as shown in FIG. 13: QGM marks the box containing the function (any_dups) as NTQZ and forces the partitioning of the "values(1)" box to be broadcast to the PMID of the table which the function any_dups is checking. It is necessary to call it once for each patititon that contains the tables marked by the query. PMID is the partition where the function any_dups must be run.

Pushout for Performance/Correctness

UPDATE/DELETE/INSERT functions must be free to be evaluated on the nodes on which the target table resides. In an MPP environment, large tables can be expected; large enough that they may not be processable by a single node. Anytime a NTQZ is forced, especially to a single node, we may incur a large overhead in moving data around to the point that the system may not be able to handle the query. To avoid this whenever possible, it is possible to reduce the NTQZ by pushing out operations that are within NTQZ but need not be.

An example could be a scan of table T with a restrictive predicate in a recursive cycle. If the scan with the restrictive predicate is pushed out of the recursion, the amount of data that must be sent to the nodes where the recursion is being performed is potentially reduced.

Overview of Optimizer Support for NTQZ and Force Partition

The preceding section describes how each of the aforementioned constructs are solved in isolation using a combination of no-TQ zones and forced partitionings. When several constructs occur simultaneously, the no-TQ zones can overlap. For example, a recursive cycle may contain references to non-parallelizable functions. A second example is that a deferred unique box can occur within a no-TQ zone for a correlated common subexpression.

The following three steps comprise the QGM processing for no-TQ zones. First, all no-TQ zones for any constructs requiring no-TQ zones are marked. Second, operations from no-TQ zones are pushed out where required for correctness or where available for performance. Third, partitionings are chosen for each no-TQ zone and all input arcs to the no-TQ zone is marked accordingly. Table 2 contains a pseudocode representation which illustrages these three steps. Note that setting the partitioning is highly dependent on the configuration of the MPP system and the types of no-TQ zone constructs. Accordingly, the pseudocode listed for this step is one solution for the example constructs discussed herein. It will be immediately apparent to those having ordinary skill in the art that the principles disclosed herein are eminently capable of modification to support alternative hardware configurations.

Prior to making the final pass over the QGM graph to create the access plan, the optimizer scans the QGM graph to gather and store information about the QGM entities. In this phase, the optimizer will note directions from QGM on partition class requirements. The two mechanisms used to communicate these requirements are the "no TQ zone (NTQZ)" flag on the boxes (QTBs) and the "Force Partition" flag on the quantifiers (QUNs), within the QTBs. In the planning pass over the QGM, the collected information is used to intelligently partition the data according to the QGM requests.

Details of Optimizer Support for NTQZ

As the optimizer scans each QGM box, it looks to see if the NTQZ flag is turned on for the box. If it is, the information is stored for efficient access.

The optimizer compiles a list of partition classes that it should try to move the input stream to before an operation is done. This list consists of partitions that have been previously determined as interesting for the current operation or possibly for an operation in the future. If an input plan does not exist with the requested partition class, an operation to move the data is attached to the plan, this operation is a TQ. As the optimizer plans each operation it checks the NTQZ information on the box that is currently being planned. If the box has been indicated as a NTQZ, the optimizer does not add partitions to the partition class list that do not already have an existing input plan. The optimizer trusts the QGM to have ensured that all of the operations within the NTQZ box can be done without moving data so the partition classes that naturally propagate with the input plans should be sufficient to create the access plan for the box. The NTQZ is over-ridden in by a "Force Partition" on a QUN within the box.

Details of Optimizer Support for Force Partition

At the same time the NTQZ is recognized, the QUNs with "Force Partition" flag set are identified. For each QUN that has the "Force Partition" flag set, the optimizer gathers the information for the requested partition class off of the QGM QUN and stores it with other information that it needs about the QUN.

The optimizer recognizes when it is completing the access plan for a QUN with "Force Partition" and only requests input plans and creates output plans with the previously stored partition class. Plans with other partition classes are not created for that QUN, this is how the QUN is forced to the one partition that was dictated by QGM. As with the NTQZ, the optimizer assumes that QGM will not force the partition classes such that the operations cannot be done.

Optimizations

The optimizer builds interesting partition classes prior to the planning phase. The "Force Partition" information is used to help in this optimization.

TCG/Runtime Support for Common Sub-Expression (CSE) and Recursion in MPP

Figure 14:
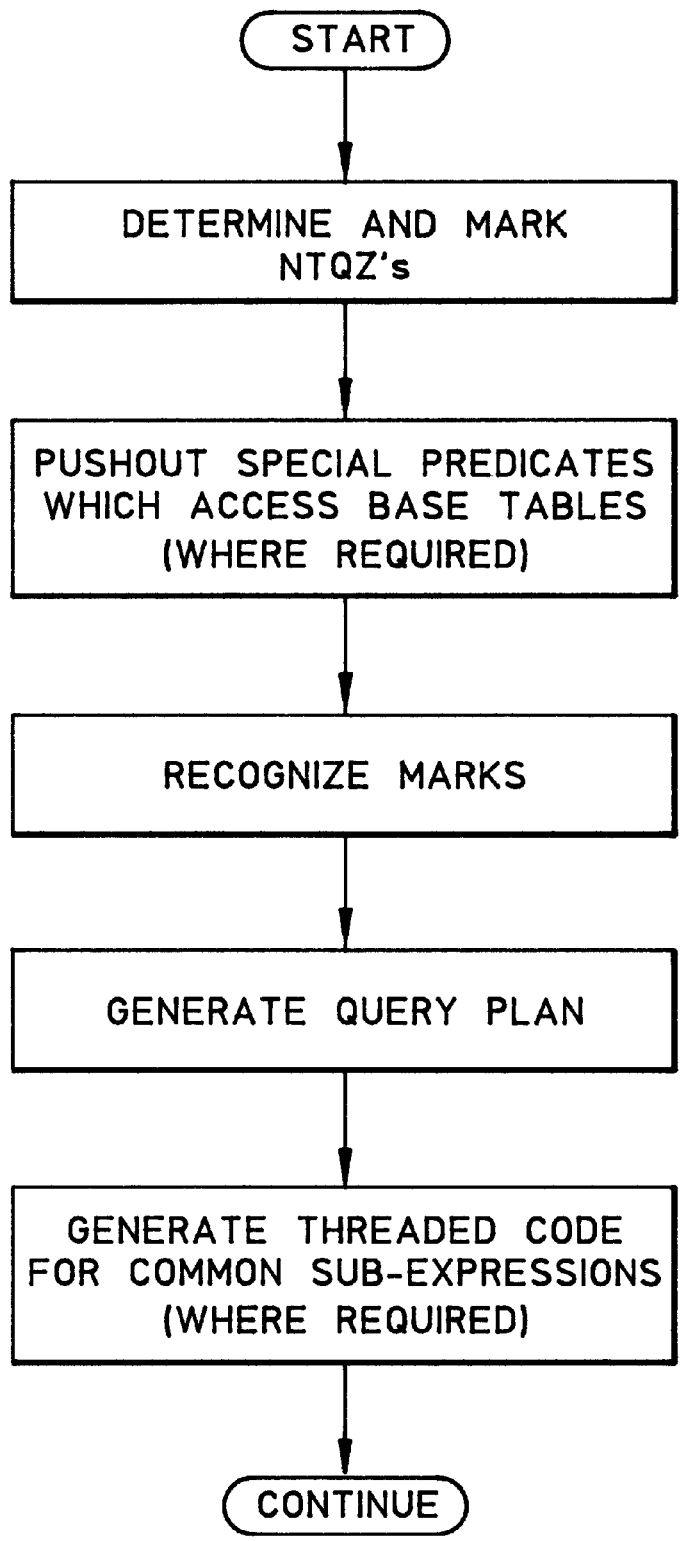
FIG. 14 is a block diagram of an overview of the principles of the present invention further implementing a threaded code generator.
Figure 15:
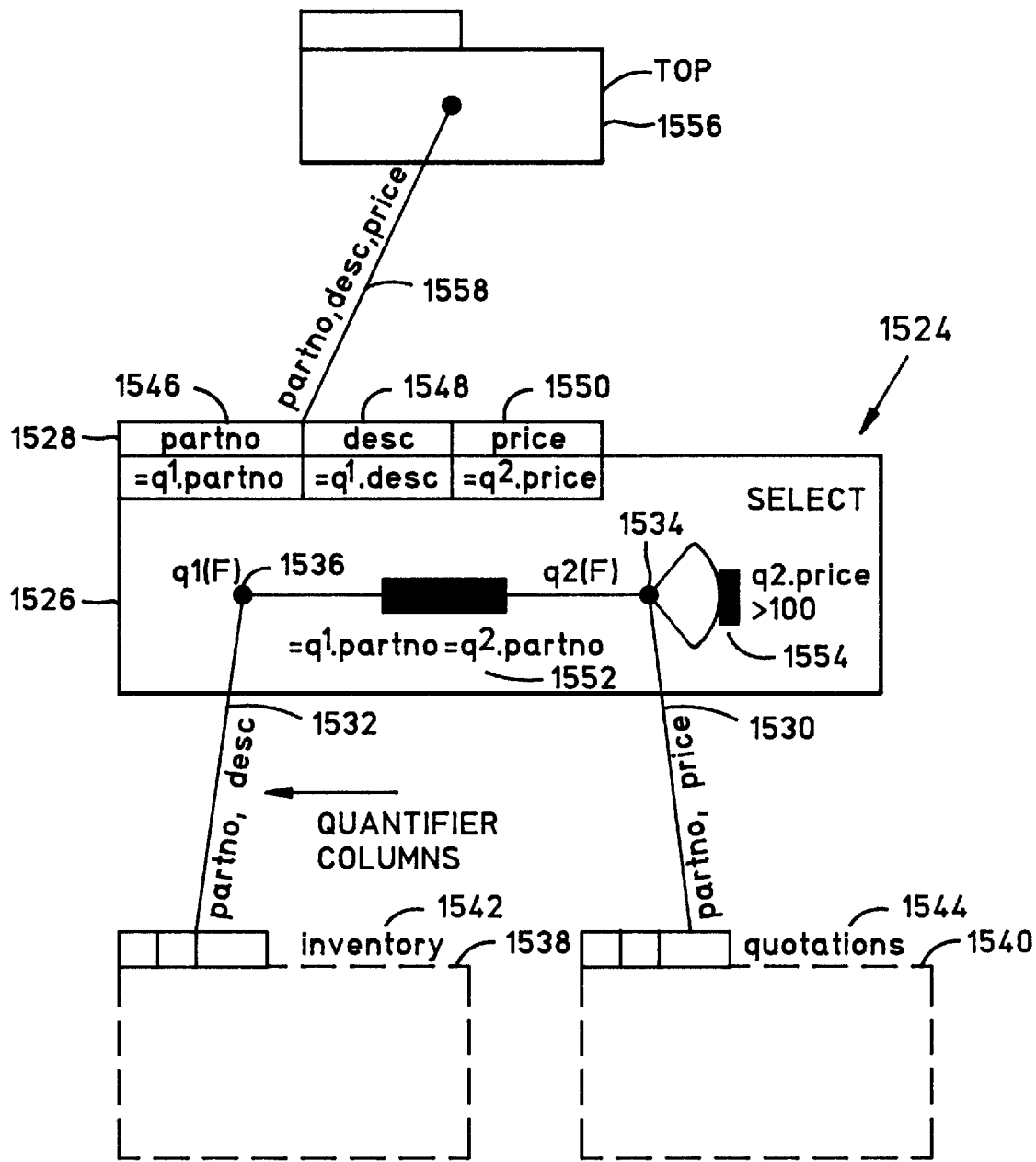
FIG. 15 is a block diagram of a QGM graphical representation of a SQL query.

Support for Common Sub-Expression (CSE) in MPP requires that access to the CSE be synchronized when the production of the subgraph and its accesses are from different logical units (subsection). This is achieved via a semaphore mechanism. Access to the CSE must wait until the semaphore is set, and it is only set when the production of the CSE is finished. In accordance with one embodiment illustrating this principle of the present invention, Table 3 discloses a pseudocode representation of one embodiment for generating the threaded code to perform the preceding actions, further shown in FIG. 14. Runtime support for common sub-expressions involves both producing the common sub-expression and accessing the common sub-expression.

Recursion in MPP has at least one, and possibly multiple, CSEs within a single recursive loop. In those cases, all non-recursive access to any of the CSEs must be synchronized. Furthermore, this synchronization must happen for the entire recursion since any CSE within a recursive loop may not be fully materialized until the whole recursion is materialized. To achieve this, a single access semaphore is used for the entire recursion, and all non-recursive access to any of CSEs must wait on this semaphore. This is detailed in FIG. 14. Again, in accordance with the principles of the present invention shown in this illustrative embodiment, Table 3 discloses a pseudocode representation of one embodiment for generating the threaded code to perform the preceding actions.

Note that all of the CSEs in a recursion share the same semaphore. Hensce, the semaphore associated with a CTE that is in a recursion is the semaphore associated with the outermost recursion that contains the CTE.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. The invention disclosed herein may be practiced without any element which is not specifically disclosed herein.

We claim:

1. Data processor implemented method for specifying complex queries to a relational database management system implemented on a parallel network, the network including a plurality of nodes coordinated by a network protocol, each of the nodes including at least one of data processor, data storage device, and memory, wherein the data contained in the base tables of the relational database management system is retrievable by means of a query language query to the database management system, the query containing at least one of query elements which require local computation or local coordination of data computation performed across the nodes of the distributed system and query elements which are computable on the several nodes of the network, the method comprising the steps of:

identifying and marking those subgraphs of the query which must be executed on one of a given node and a nodegroup as "No TQ Zones", or NTQZs;

recognizing the marks written on those subgraphs of the query which must be executed on a given node or nodegroup by the identifying and marking step;

responsive to the recognizing step, generating a query plan which forces the computation of the marked subgraphs to be in the same section of the query plan;

responsive to the step of generating a query plan, partitioning that query plan into subplans including the NTQZs marked in the identifying and marking step, whereby the partitions formed by the partitioning step force the operation of subplans including a NTQZ to at least one of a single-node, the coordinator node, the catalog node, and to a particular partition class on multiple nodes; and executing the query plan.

2. The method of claim 1 further applicable to queries containing common sub-expressions and, responsive to the step of generating the query plan, comprising the further step of generating threaded code for the common sub-expressions prior to the step of executing the query plan.

3. A system for processing complex queries, comprising:

a parallel network including a plurality of nodes coordinated by a network protocol, each of the nodes including at least one of data processor, data storage device, and memory;

a relational database management system having data contained in base tables, wherein the data is retrievable by means of a query language query to the database management system, and the query contains at least one of query elements which require local computation or local coordination of data computation performed across the nodes of the distributed system and query elements which are computable on the several nodes of the parallel network;

a data processor for specifying the query to the relational database management system, the data processor operative for:

identifying and marking those subgraphs of the query which must be executed on one of a given node and a nodegroup as "No TQ Zones", or NTQZs;

recognizing the marks written on those subgraphs of the query which must be executed on a given node or nodegroup by the identifying and marking step;

responsive to the recognizing step, generating a query plan which forces the computation of the marked subgraphs to be in the same section of the query plan;

responsive to the step of generating a query plan, partitioning that query plan into subplans including the NTQZs marked in the identifying and marking step, whereby the partitions formed by the partitioning step force the operation of subplans including a NTQZ to at least one of a single-node, the coordinator node, the catalog node, and to a particular partition class on multiple nodes; and executing the query plan.

4. The system of claim 3 further applicable to queries containing common sub-expressions, and wherein the data processor is further operative for, responsive to the step of generating the query plan, generating threaded code for the common sub-expressions prior to the step of executing the query plan.

5. A database language compiler for specifying complex queries to a relational database management system implemented on a parallel network, the network including a plurality of nodes coordinated by a network protocol, each of the nodes including at least one of data processor, data storage device, and memory, wherein the data contained in the base tables of the relational database management system is retrievable by means of a query language query to the database management system, the query containing at least one of query elements which require local computation or local coordination of data computation performed across the nodes of the distributed system and query elements which are computable on the several nodes of the network, the database language compiler operative for:

identifying and marking those subgraphs of the query which must be executed on one of a given node and a nodegroup as "No TQ Zones", or NTQZs;

recognizing the marks written on those subgraphs of the query which must be executed on a given node or nodegroup by the identifying and marking step;

responsive to the recognizing step, generating a query plan which forces the computation of the marked subgraphs to be in the same section of the query plan;

responsive to the step of generating a query plan, partitioning that query plan into subplans including the NTQZs marked in the identifying and marking step, whereby the partitions formed by the partitioning step force the operation of subplans including a NTQZ to at least one of a single-node, the coordinator node, the catalog node, and to a particular partition class on multiple nodes; and executing the query plan.

6. The database language compiler of claim 5 further applicable to queries containing common sub-expressions and, responsive to the step of generating the query plan, comprising the further step of generating threaded code for the common sub-expressions prior to the step of executing the query plan.

7. A computer program product for specifying complex queries to a relational database management system implemented on a parallel network, the network including a plurality of nodes coordinated by a network protocol, each of the nodes including at least one of data processor, data storage device, and memory, wherein the data contained in the base tables of the relational database management system is retrievable by means of a query language query to the database management system, the query containing at least one of query elements which require local computation or local coordination of data computation performed across the nodes of the distributed system and query elements which are computable on the several nodes of the network, the computer program product comprising:

a storage medium;

computer software stored on the storage medium and executable on a data processor for:

identifying and marking those subgraphs of the query which must be executed on one of a given node and a nodegroup as "No TQ Zones", or NTQZs;

recognizing the marks written on those subgraphs of the query which must be executed on a given node or nodegroup by the identifying and marking step;

responsive to the recognizing step, generating a query plan which forces the computation of the marked subgraphs to be in the same section of the query plan;

responsive to the step of generating a query plan, partitioning that query plan into subplans including the NTQZs marked in the identifying and marking step, whereby the partitions formed by the partitioning step force the operation of subplans including a NTQZ to at least one of a single-node, the coordinator node, the catalog node, and to a particular partition class on multiple nodes; and executing the query plan.

8. The computer program product of claim 7 further applicable to queries containing common sub-expressions and, responsive to the step of generating the query plan, comprising the further step of generating threaded code for the common sub-expressions prior to the step of executing the query plan.

* * * * *